(12) United States Patent
Wall

(10) Patent No.: US 11,305,891 B2
(45) Date of Patent: Apr. 19, 2022

(54) GEARBOX COVER, PORT PLUGS, AND MAST CAP FOR AIRCRAFT

(71) Applicant: Bell Helicopter Textron Inc., Fort Worth, TX (US)

(72) Inventor: Jon Earl Wall, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 773 days.

(21) Appl. No.: 16/130,139

(22) Filed: Sep. 13, 2018

(65) Prior Publication Data

US 2020/0087007 A1 Mar. 19, 2020

(51) Int. Cl.
| | |
|---|---|
| *B64F 5/50* | (2017.01) |
| *B01D 53/26* | (2006.01) |
| *B01D 53/04* | (2006.01) |
| *B64C 27/32* | (2006.01) |
| *B64C 27/12* | (2006.01) |

(52) U.S. Cl.
CPC ............ *B64F 5/50* (2017.01); *B01D 53/0407* (2013.01); *B01D 53/261* (2013.01); *B01D 2253/106* (2013.01); *B01D 2257/80* (2013.01); *B01D 2259/4575* (2013.01); *B64C 27/12* (2013.01); *B64C 27/32* (2013.01)

(58) Field of Classification Search
CPC ..... B64F 5/50; B01D 53/0407; B01D 53/261; B01D 2253/106; B01D 2257/80; B01D 2259/4575; B64C 27/12; B64C 27/32
See application file for complete search history.

(56) References Cited

U.S. PATENT DOCUMENTS

2016/0258535 A1* 9/2016 Jurrell .................... B64C 27/32

FOREIGN PATENT DOCUMENTS

| CN | 101776232 B | * | 3/2013 | | |
| CN | 106949100 A | * | 7/2017 | ........... | F04D 29/644 |
| WO | WO-2015006479 A1 | * | 1/2015 | ......... | C23C 18/1641 |

* cited by examiner

*Primary Examiner* — Justin M Benedik
(74) *Attorney, Agent, or Firm* — Fogarty LLP

(57) ABSTRACT

Embodiments are directed to gearbox covers, mast caps, port plugs, and other coverings or lids that can be used to protect aircraft components against corrosion and contaminants. The protective coverings may be may be manufactured using three-dimensional printing or other additive manufacturing fabrication methods. The protective coverings are ultraviolet-light resistant, weather resistant, and impact resistant. The protective coverings may include a desiccant filter to reduce an aircraft component's exposure to water. The protective coverings may attach to the aircraft components using thumbscrews and may include an O-ring or gasket that creates an airtight and watertight seal.

8 Claims, 13 Drawing Sheets

GEARBOX COVER, PORT PLUGS, AND MAST CAP FOR AIRCRAFT

BACKGROUND

Aircraft maintenance provides the actions necessary to sustain or restore the integrity and performance of the aircraft. Maintenance processes may be initiated at set time intervals, such as scheduled maintenance at specific calendar times, flight hours, or flight cycles, or may be initiated based upon the condition of components, such as unscheduled maintenance on components that fail, do not meet standards, or reach deterioration limits. Maintenance is carried out on aircraft to ensure the aircraft can operate safely and to maintain aircraft availability.

Aircraft maintenance can be divided into four categories: periodic inspections, overhauls, replacement of retirement parts, and unscheduled. Periodic inspections include inspection tasks, along with parts requirements, required by a maintenance manual for the aircraft model. Overhauls include removal, disassembly, inspection, parts replacement, reassembly and reinstallation of certain components/assemblies at the periods stated in the maintenance manual. Retirement parts are those subject to disposal after an operating time stated in the maintenance manual. For example, components of the rotor and control systems are subject to oscillatory loads and are designed for use over a finite number of flight hours before being replaced. Unscheduled maintenance includes major maintenance not covered under the formal maintenance manual requirements for inspections and overhauls and/or additional maintenance requirements imposed by the manufacturer through service bulletins.

Certain frequent and/or routine maintenance may be performed at the aircraft owner/operator location by qualified technicians or mechanics. Other more complex overhauls and repairs may need to be performed by highly trained technicians or mechanics at specialized depot or customer service facilities. Aircraft components may need to be removed from the aircraft and/or disassembled during maintenance. It is important that all components removed from the aircraft are protected and not exposed to potential sources of corrosion, contaminants, or foreign object damage. In prior maintenance practices, openings in aircraft components were often covered using makeshift means such as plastic sheeting and tape to protect the component.

SUMMARY

Embodiments are directed to gearbox covers, mast caps, port plugs, and other coverings or lids that can be used to protect aircraft components against corrosion and contaminants. The protective coverings may be may be manufactured using additive manufacturing fabrication methods. The protective coverings are ultraviolet (UV) light resistant, weather resistant, and impact resistant. The protective coverings may include a desiccant filter to reduce an aircraft component's exposure to water. The protective coverings may attach to the aircraft components using thumbscrews and may include an O-ring or gasket that creates an airtight and watertight seal.

BRIEF DESCRIPTION OF THE DRAWINGS

Figure 1:
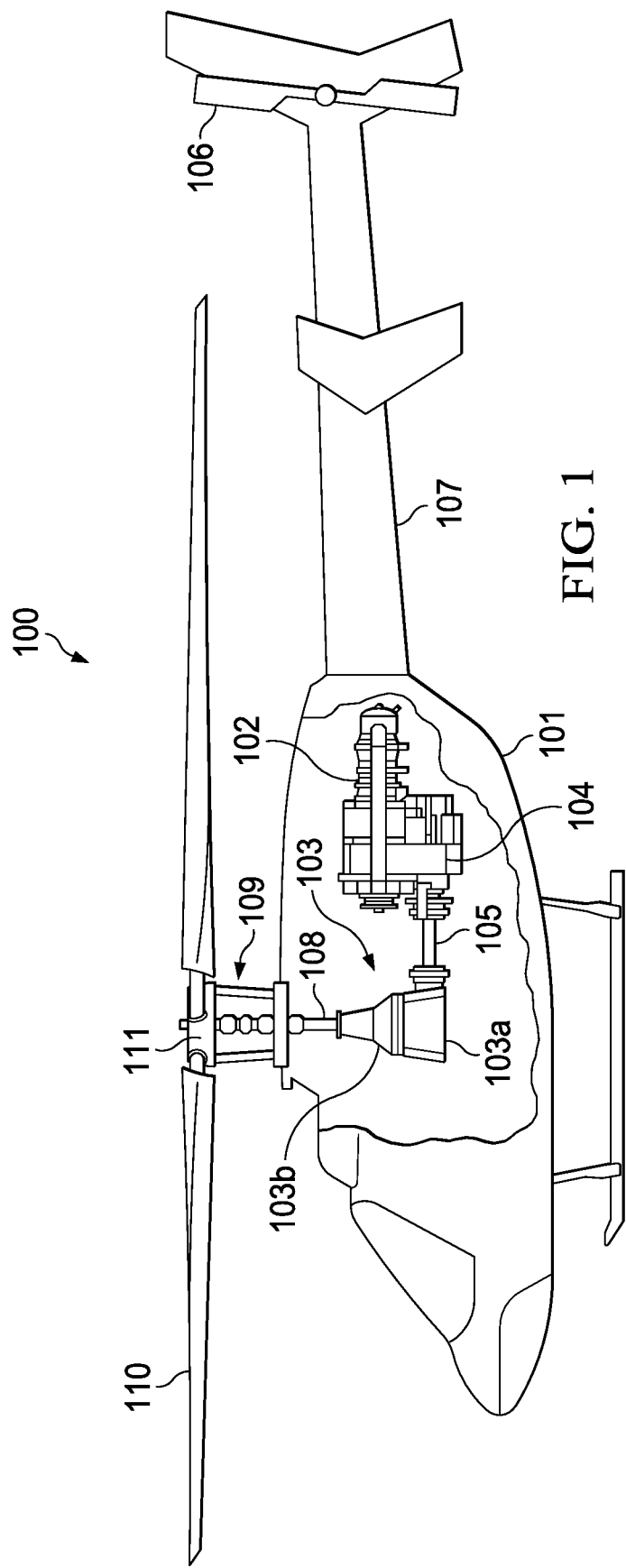

Having thus described the invention in general terms, reference will now be made to the accompanying drawings, which are not necessarily drawn to scale, and wherein:

FIG. 1 illustrates a helicopter with a main rotor gearbox and mast assembly capable of employing embodiments of the disclosed gearbox cover, port plugs, and mast cap.

Figure 2:
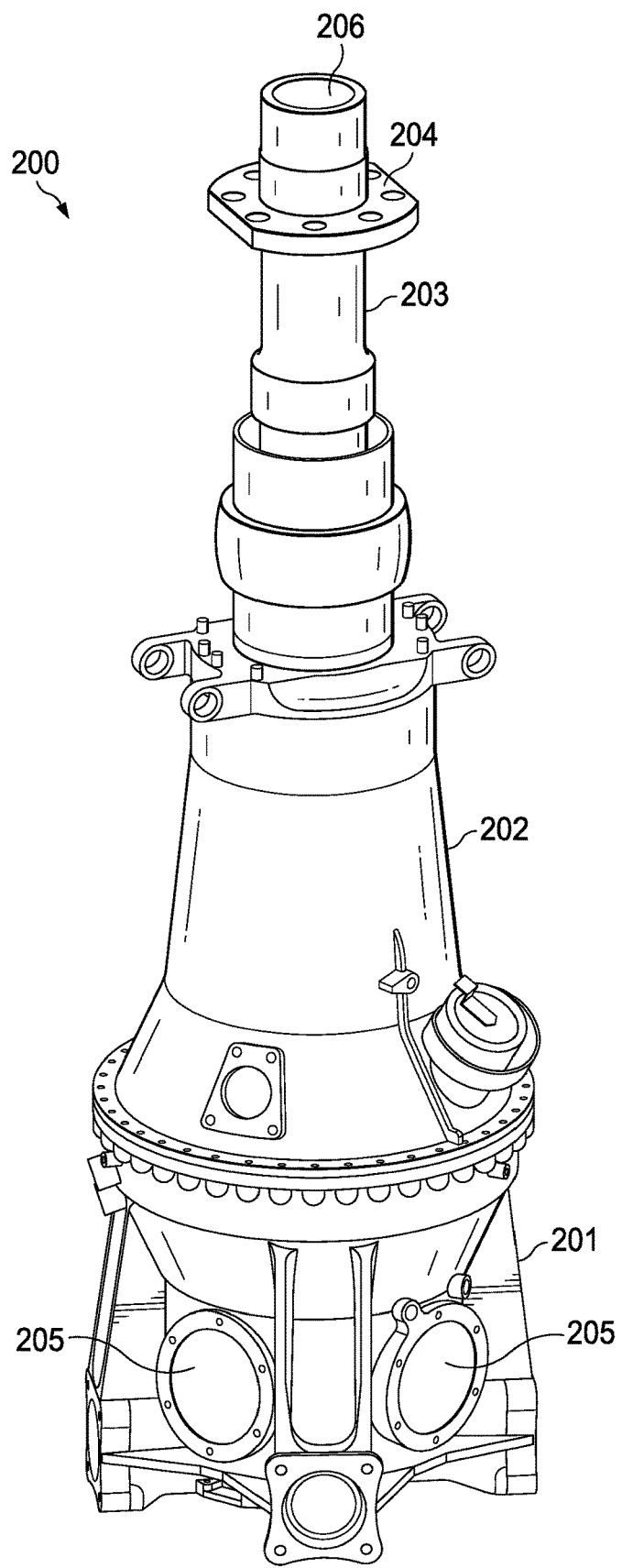

FIG. 2 illustrates example components for a helicopter transmission assembly.

Figure 3:
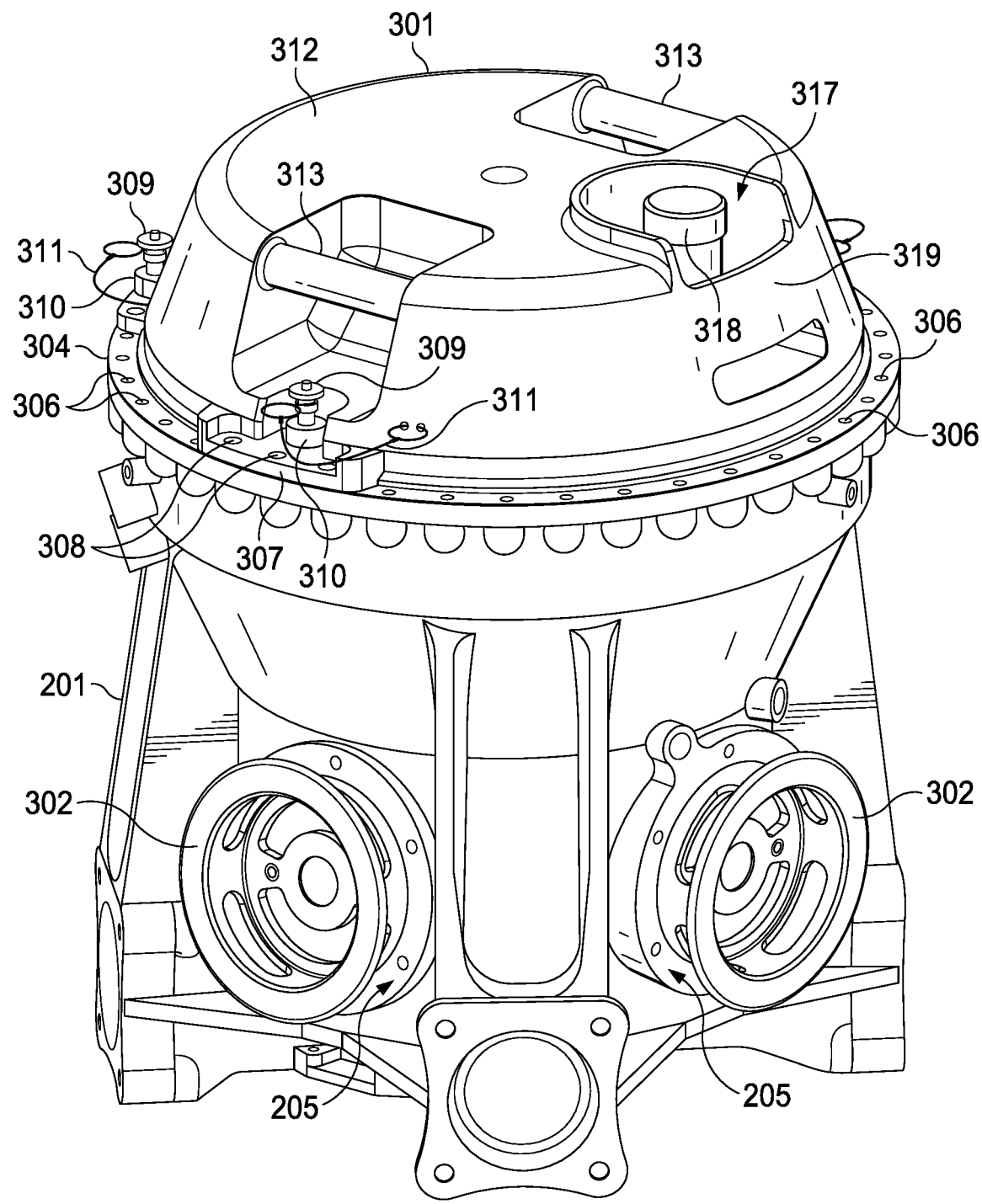

FIG. 3 illustrates a lower main rotor gearbox case separate from the rest of the transmission assembly and with a cover and plugs attached.

Figure 4A:
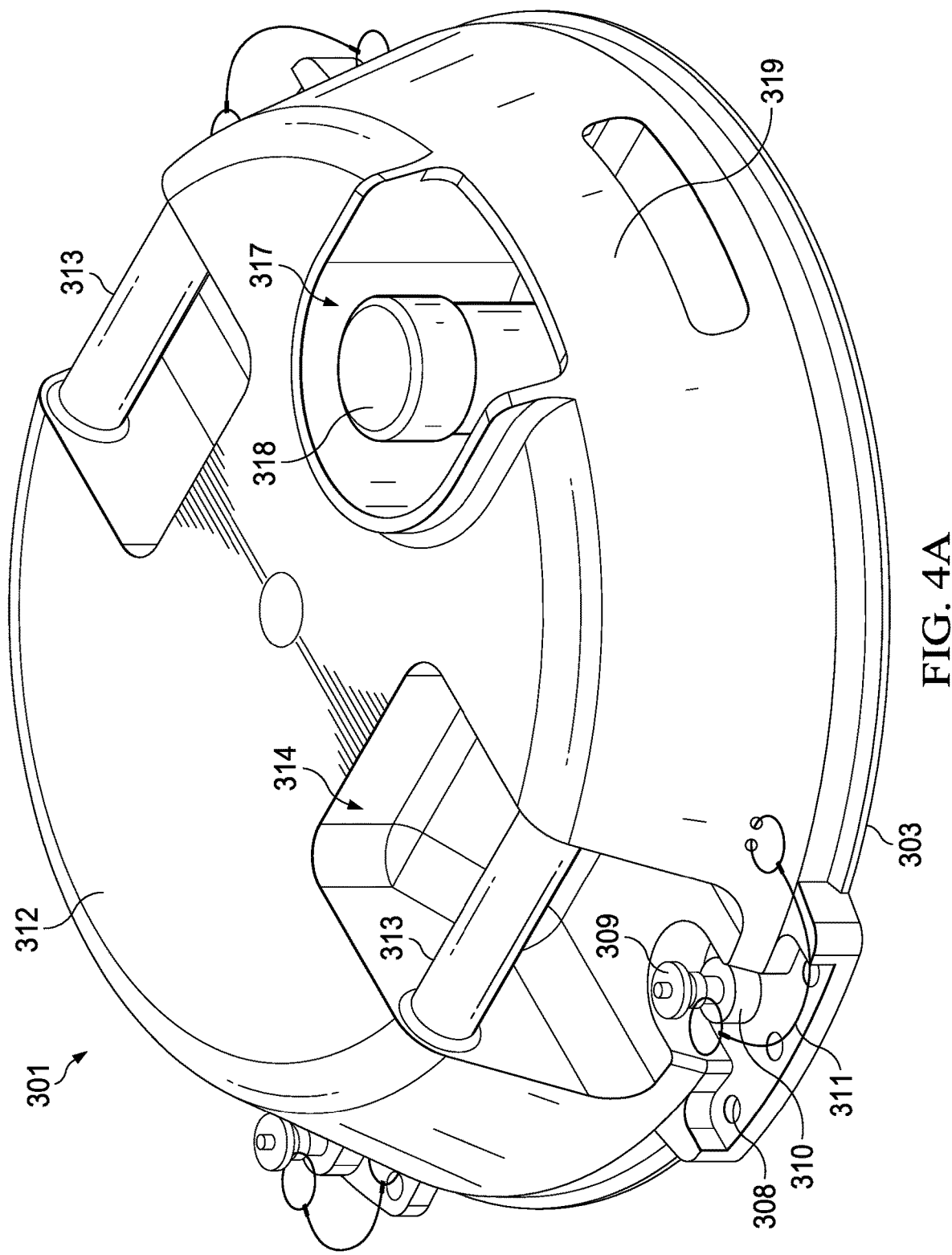

FIG. 4A is an oblique view of the top of a lower main rotor gearbox cover.

Figure 4B:
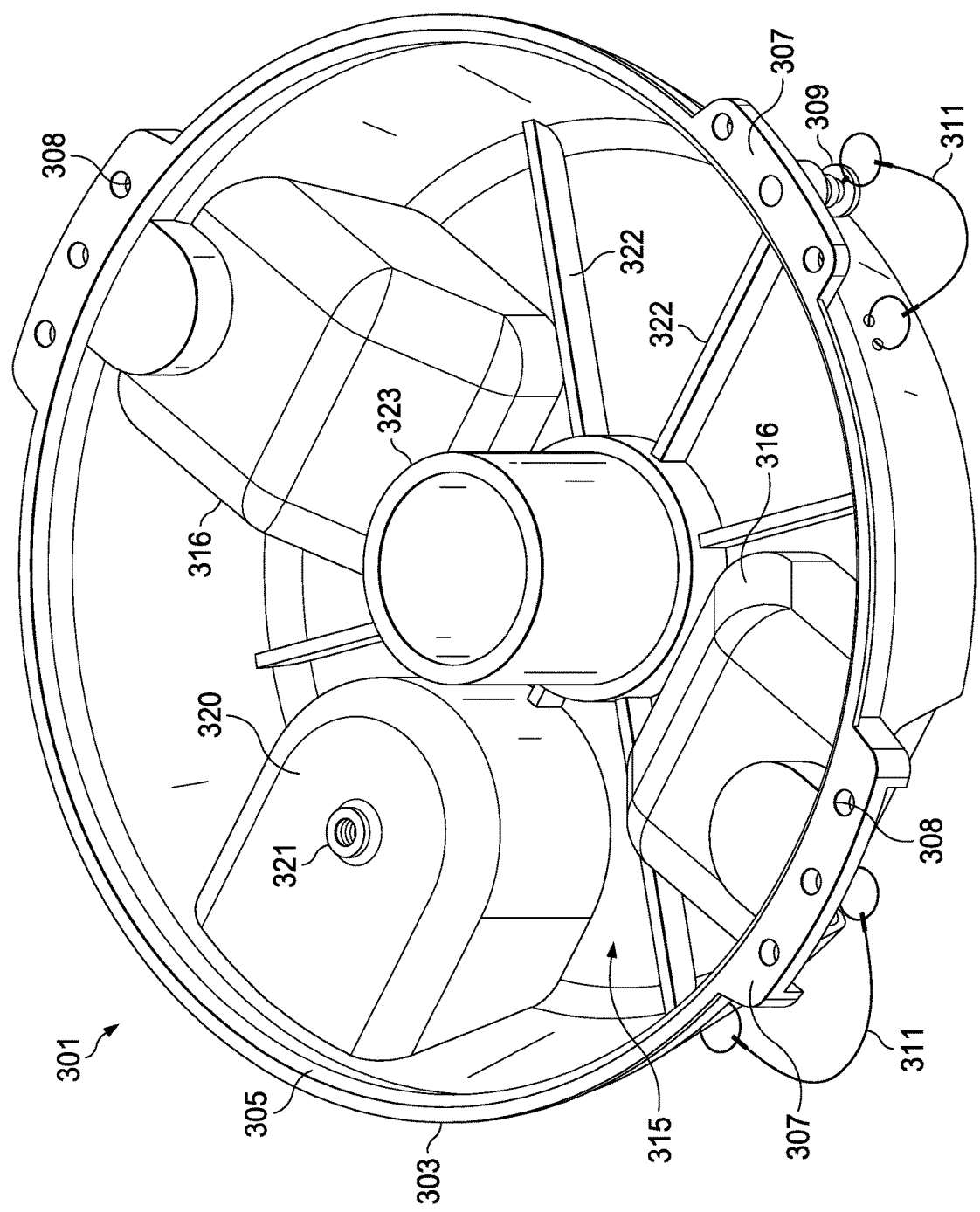

FIG. 4B is an oblique view of the bottom of the lower main rotor gearbox cover.

Figure 5A:
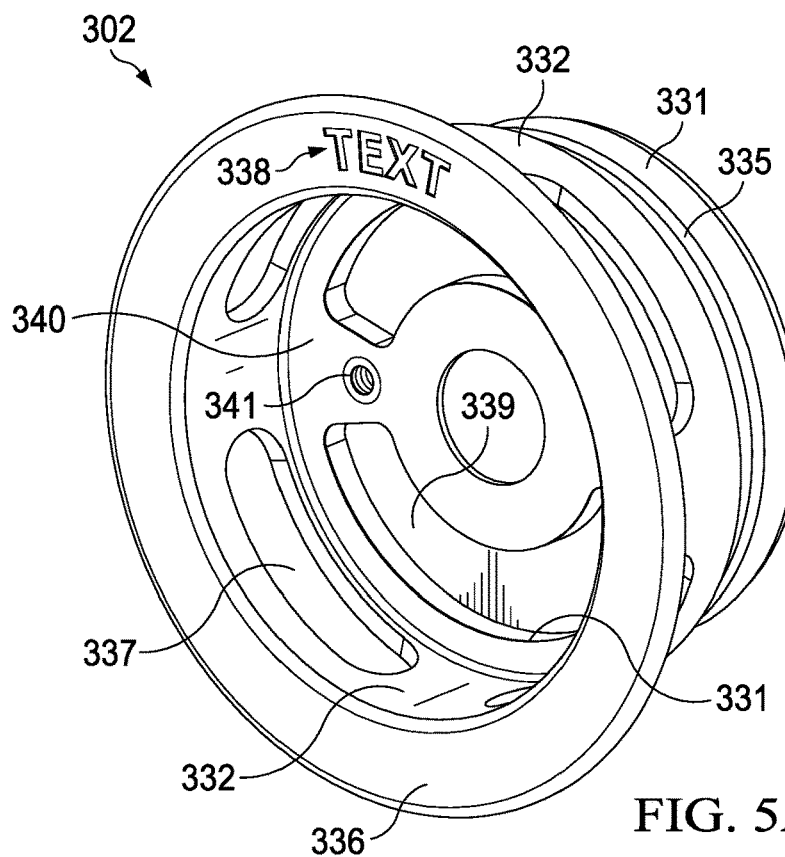

FIG. 5A is an oblique view of the top of a lower main rotor gearbox plug.

Figure 5B:
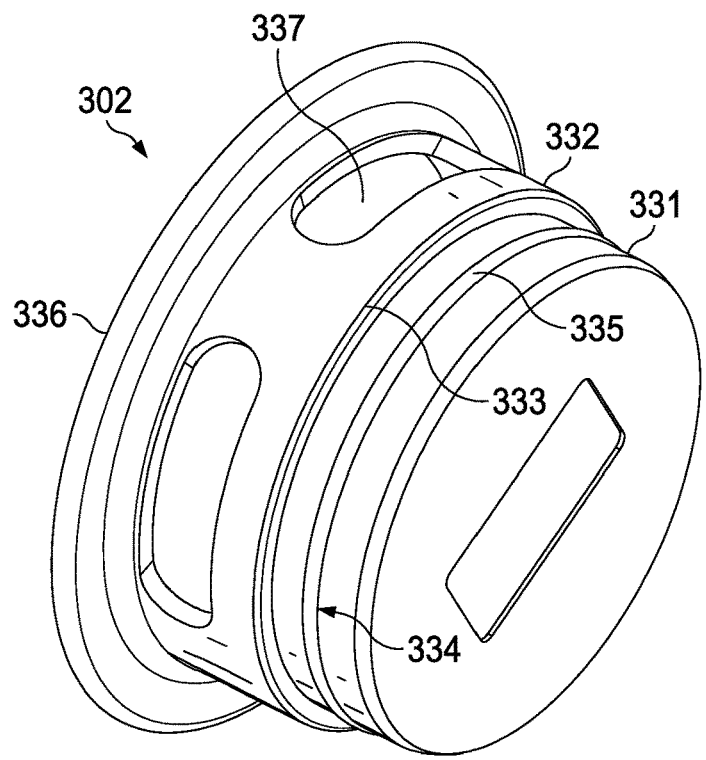

FIG. 5B is an oblique view of the bottom of the lower main rotor gearbox plug.

Figure 6:
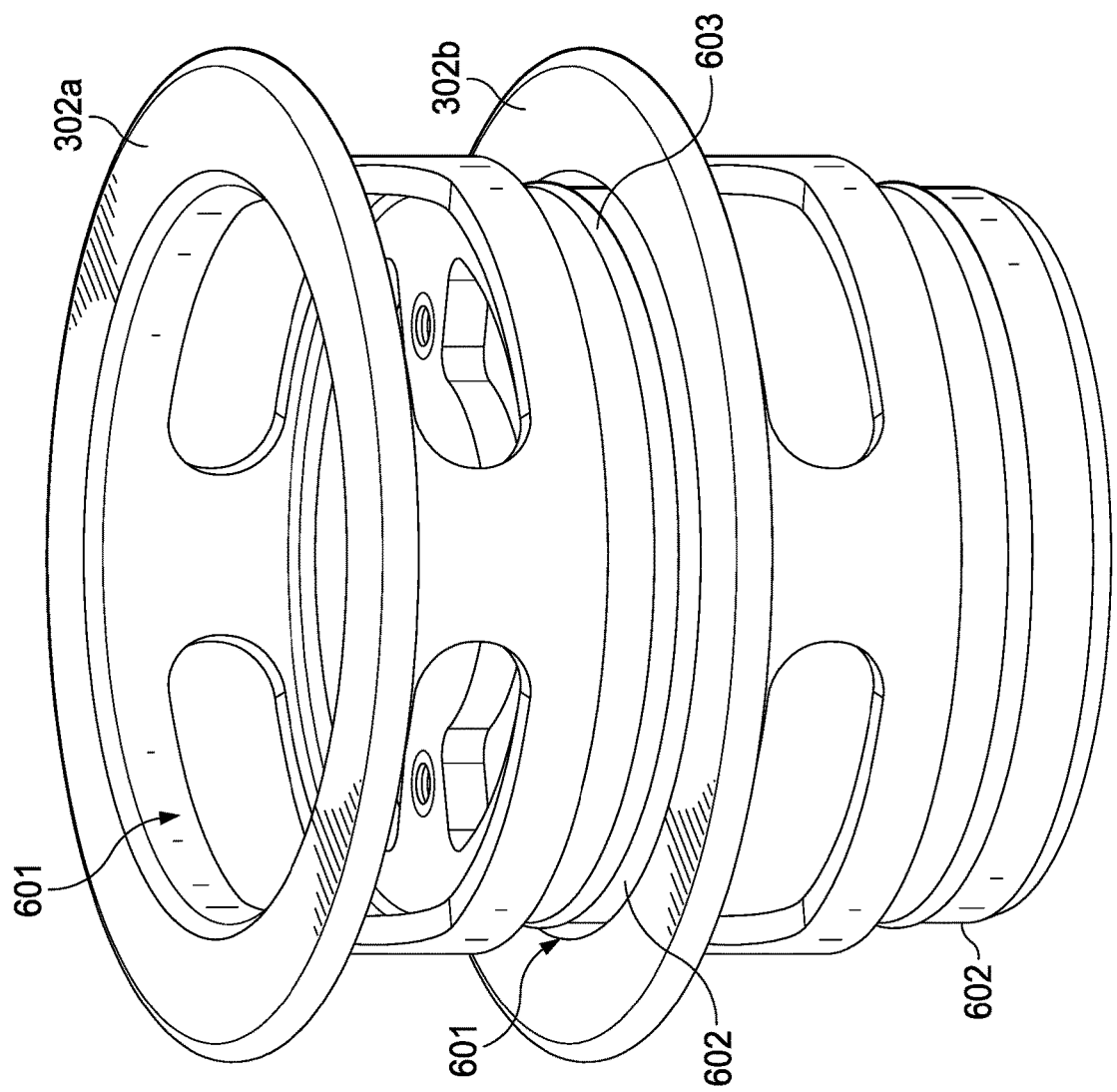

FIG. 6 is an oblique view of two lower main rotor gearbox plugs stacked together.

Figure 7:
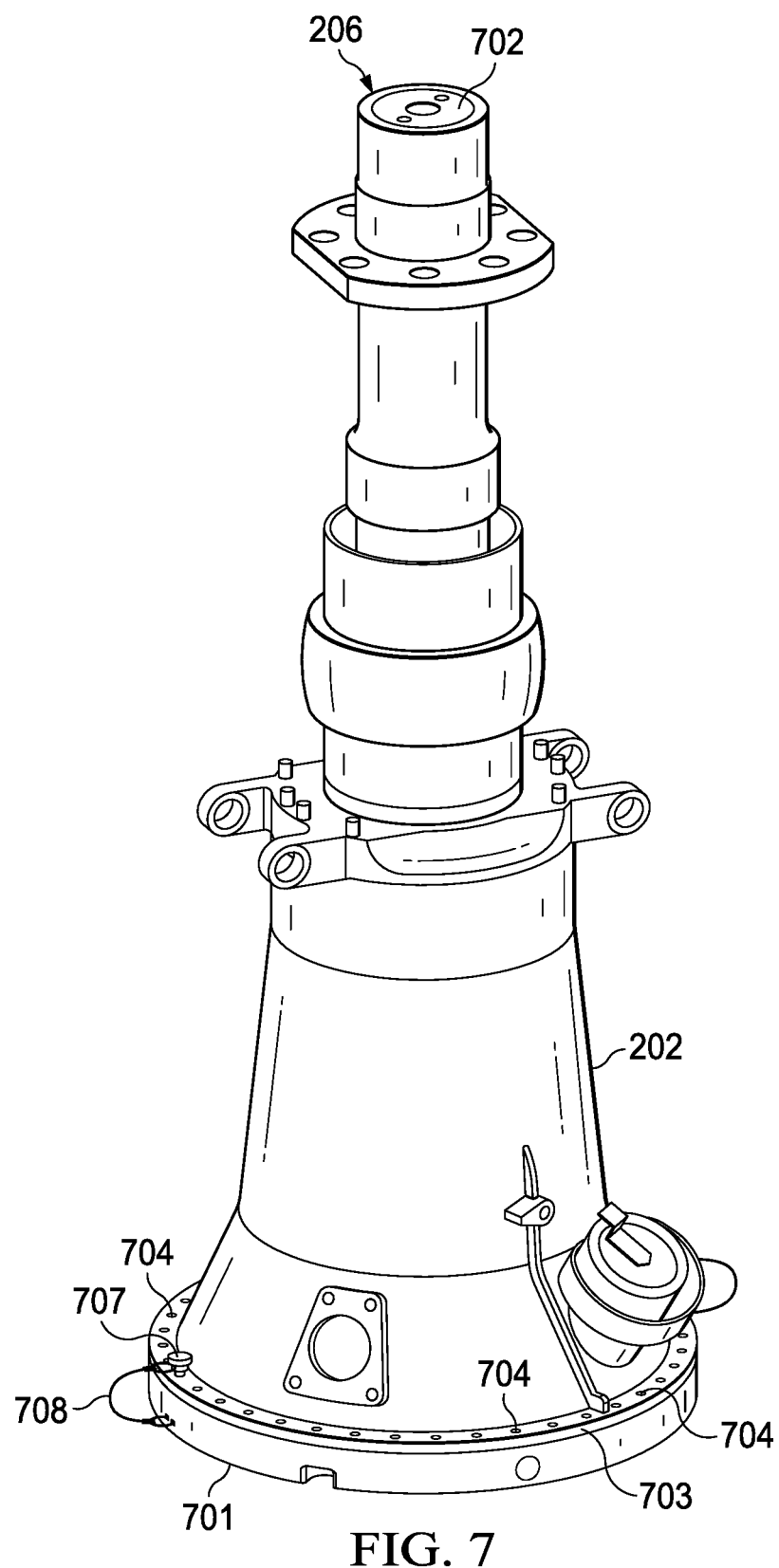

FIG. 7 illustrates an upper main rotor gearbox case separate from the rest of the transmission assembly and with a cover and plug attached.

Figure 8A:
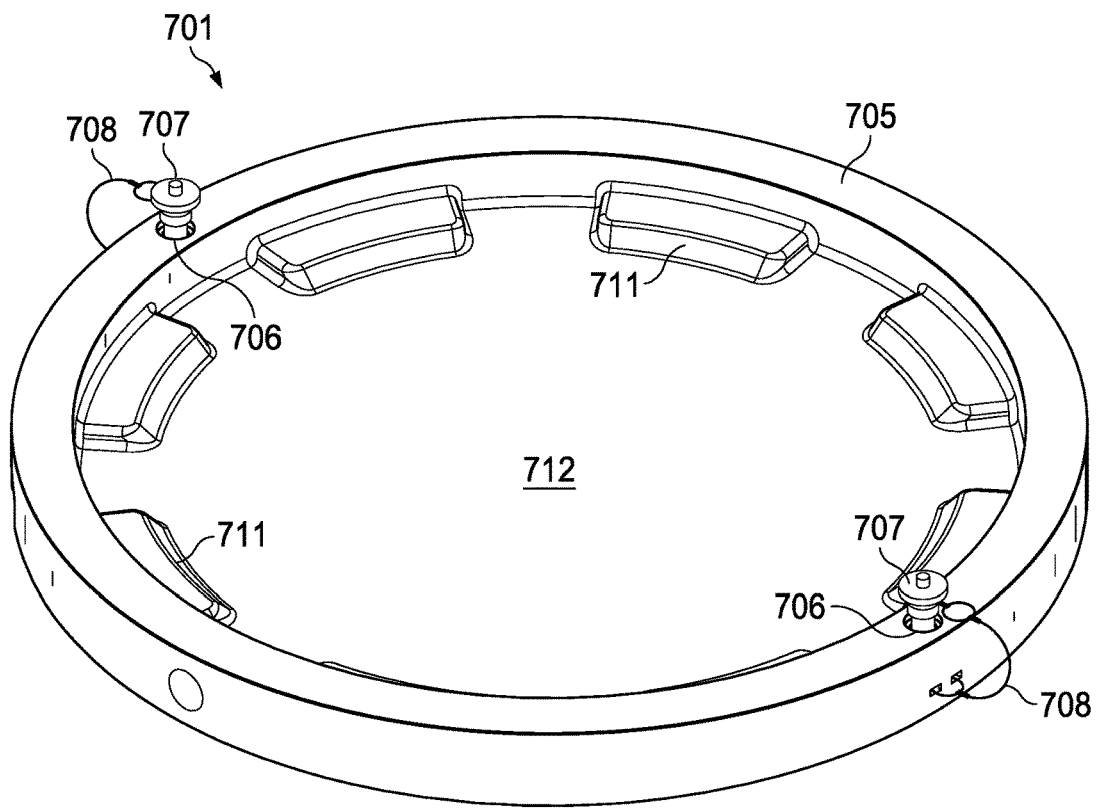

FIG. 8A is an oblique view of the top of an upper main rotor gearbox case cover.

Figure 8B:
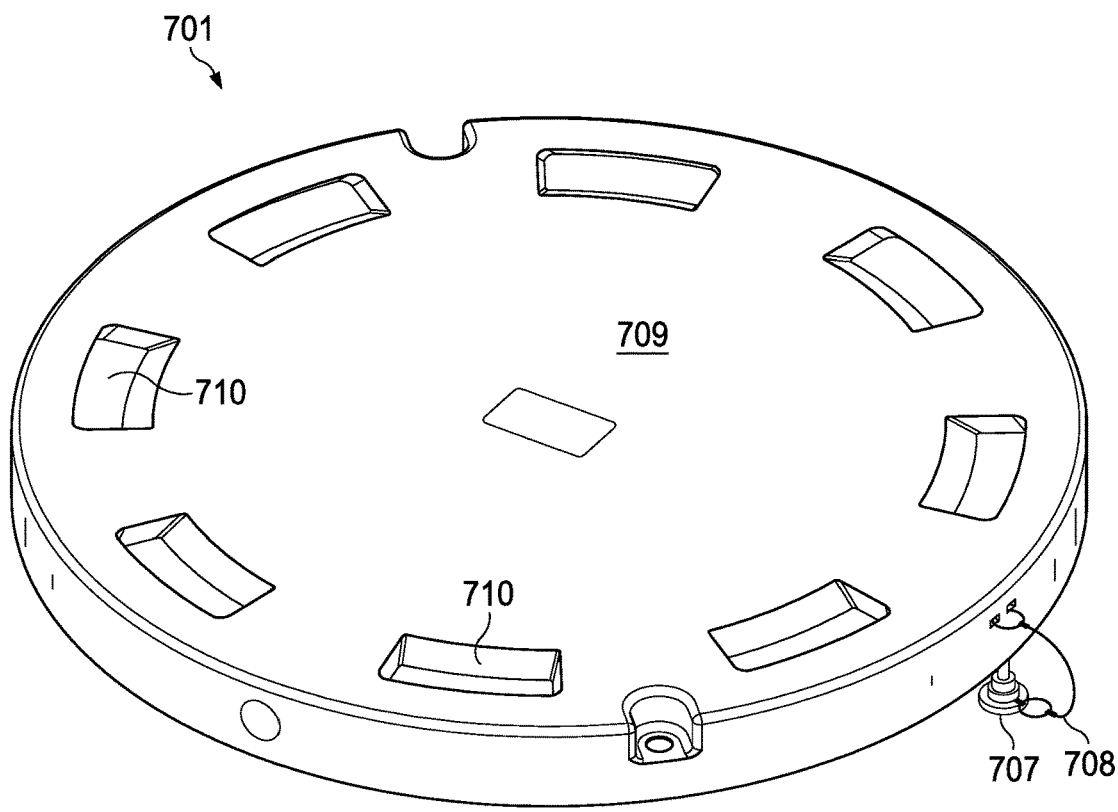

FIG. 8B is an oblique view of the bottom of the upper main rotor gearbox case cover.

Figure 9:
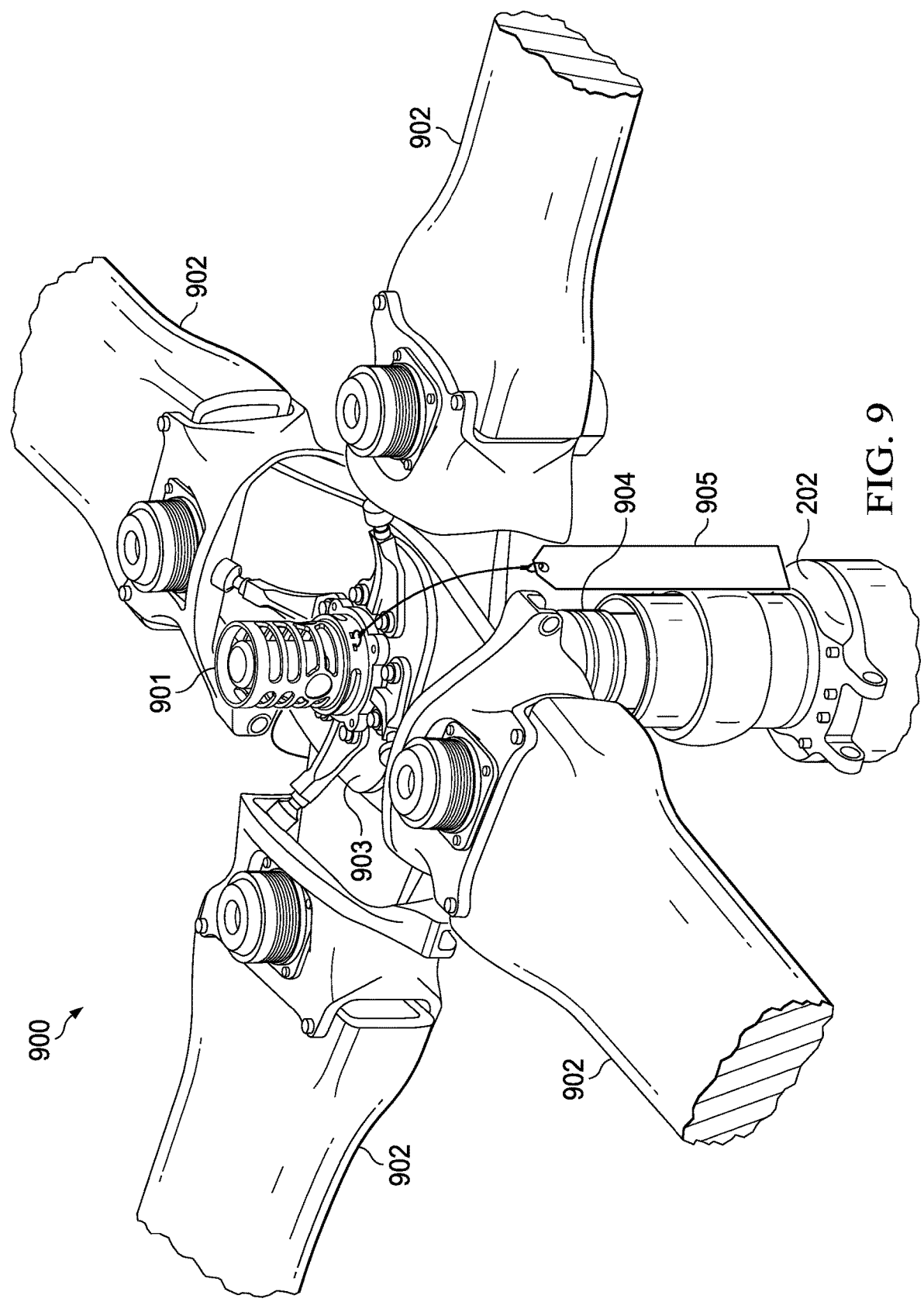

FIG. 9 illustrates a rotor system and upper main rotor gearbox case with a mast cap attached.

Figure 10A:
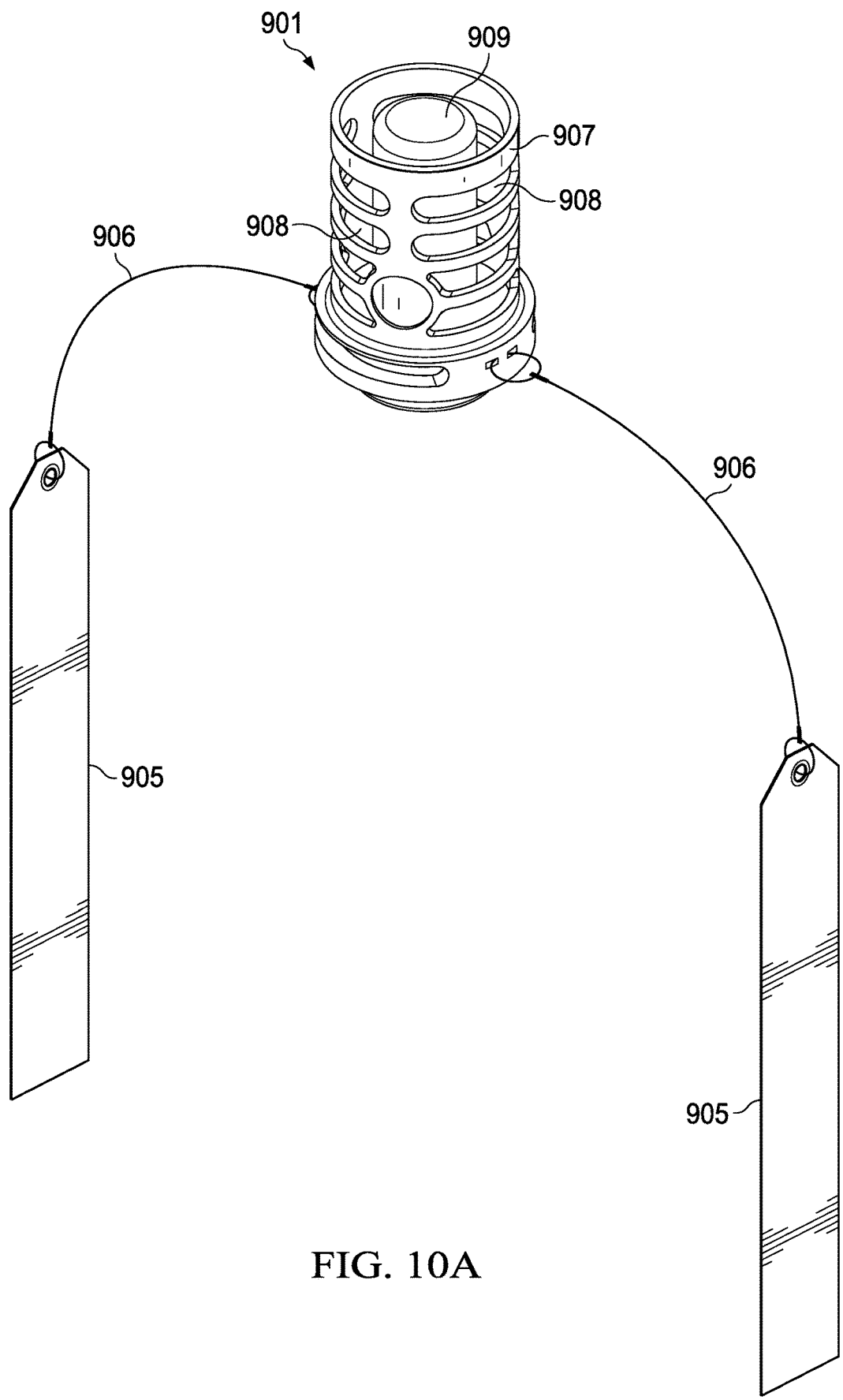

FIG. 10A is an oblique view of the top of the mast cap.

Figure 10B:
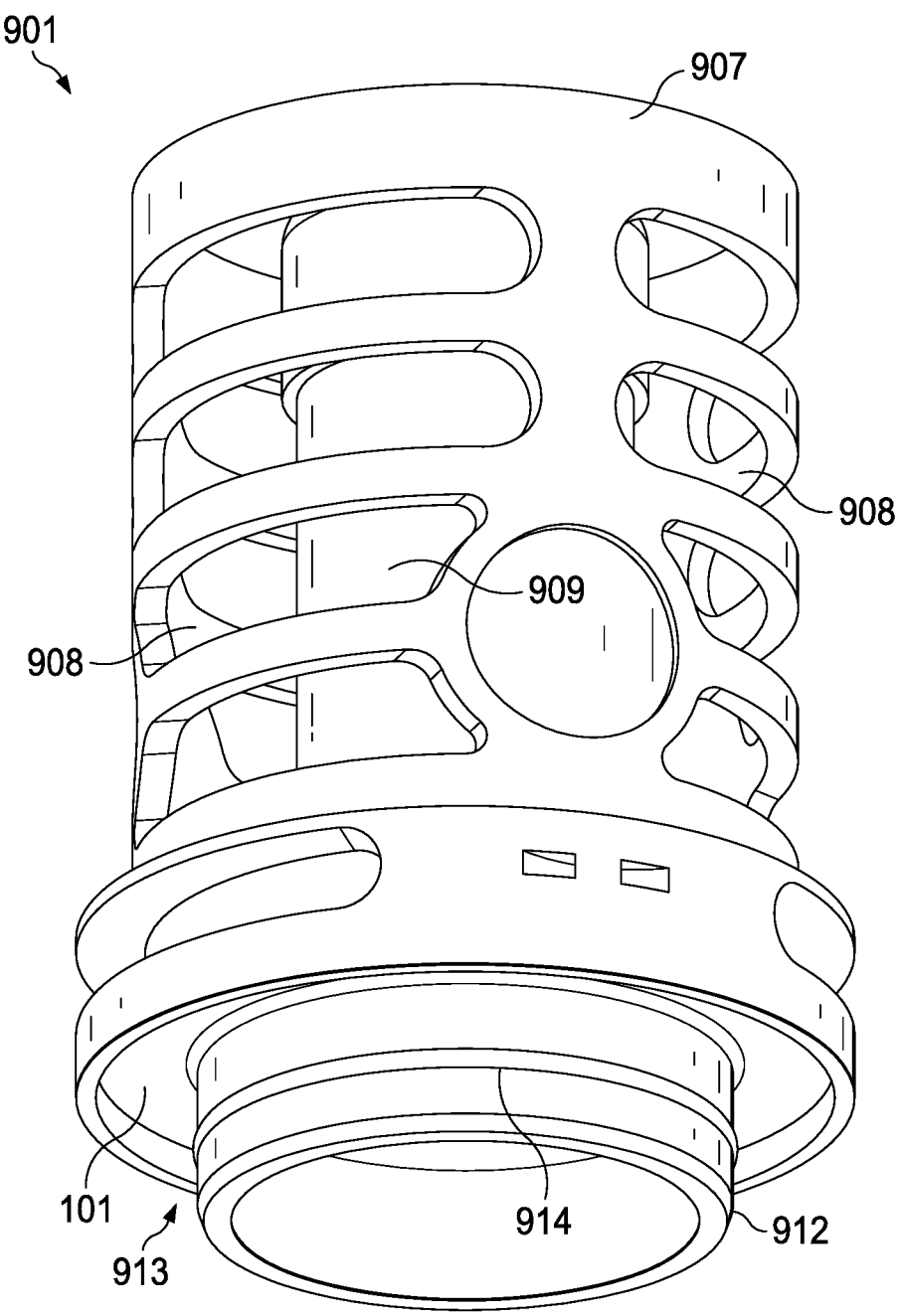

FIG. 10B is an oblique view of the bottom of the mast cap.

Figure 10C:
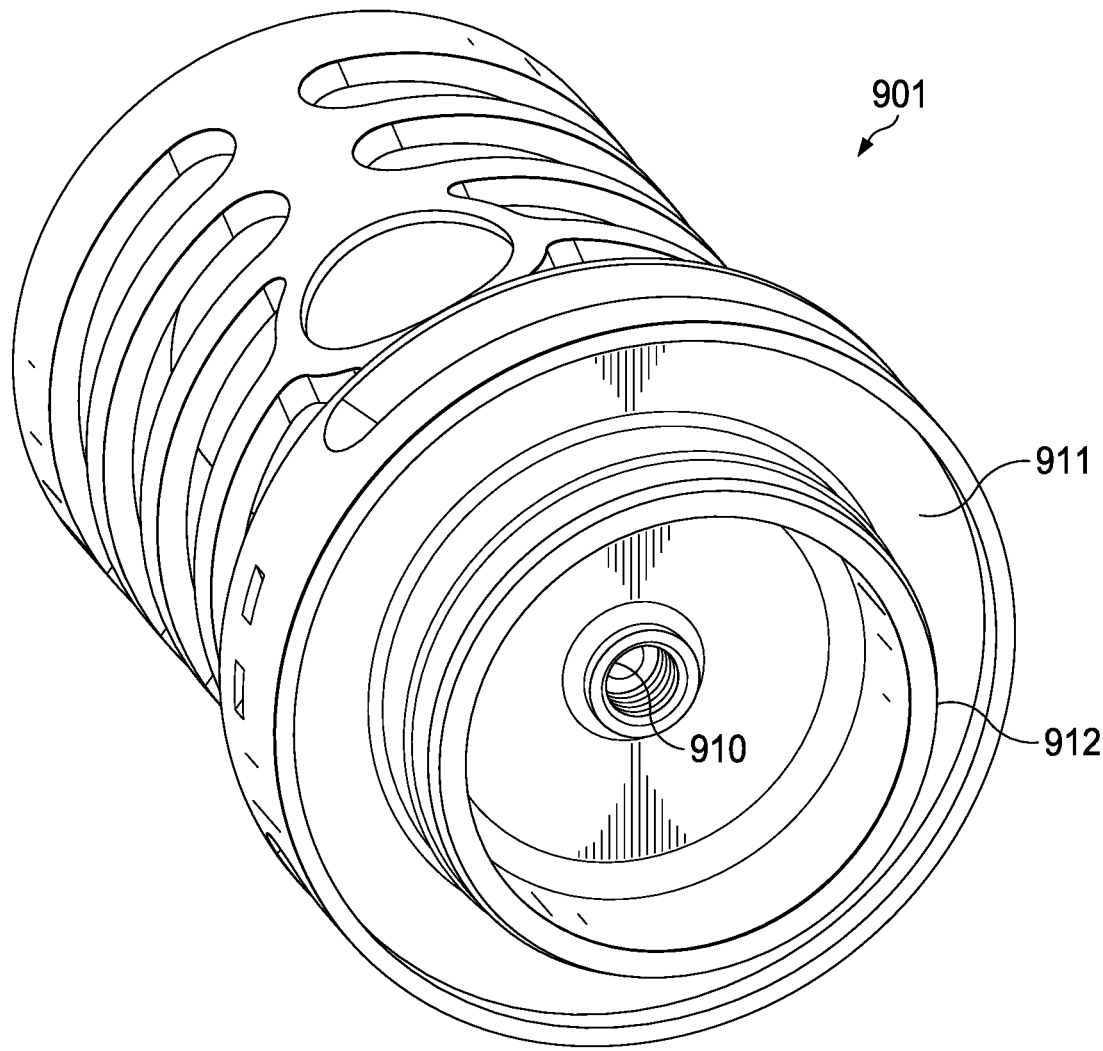

FIG. 10 C is a bottom view of mast cap.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1. illustrates a helicopter 100 comprising a fuselage 101, an engine 102, a main rotor gearbox (MRGB) 103 that is mechanically coupled to the engine 102 through an accessory gearbox 104. Accessory gearbox 104 has a drive-shaft 105 powering MRGB 103. The accessory gearbox 104 also has a rear drive-shaft (not shown) that powers the tail rotor 106, which functions as an anti-torque system mounted on tail member 107. Accessory gearbox 104 has attachment points for the engine accessories, such a starter-generator, a fuel pump, tachometers, etc. A mast 108 mechanically couples MRGB 103 to rotor system 109. The rotor system 109 comprises rotor blades 110 that are coupled to mast 108 via a hub 111. Engine 102 supplies torque to main rotor mast 101 via MRGB 103 to rotate main rotor blades 110. Engine 102 also supplies torque to a tail rotor drive shaft to rotate tail rotor 106.

Rotor blades 110 provide lift to enable flight for helicopter 100. The rotor blades 110 are controlled by multiple controllers within fuselage 101. The pitch of each rotor blade 109 can be manipulated to selectively control direction, thrust, and lift of the helicopter 100. For example, during flight a pilot can manipulate a cyclic controller to change the pitch angle of rotor blades 110 and/or manipulate pedals to provide vertical, horizontal, and yaw flight movement. Further, the pitch of tail rotor 106 blades can be selectively controlled to selectively control yaw of helicopter 100.

Gearbox 103 functions to convert high speed rotation of output drive shaft 105 of engine 102 into lower speed rotation of main rotor mast 108. MRGB 103 may have multiple parts, such as an upper case 103a and a lower case 103b. Gearbox 103 may include a plurality of gears and bearings. A gear is a rotating part having teeth that mesh with another toothed part to transmit torque. Gears in MRGB 103 may be used to provide speed and torque conversions. A bearing may include any of various machine elements that constrain the relative motion between two or more parts to only the desired motion. Bearings in MRGB 103 may perform tasks such as supporting a gear shaft. The manufacturer of helicopter 101 and/or regulatory agencies, such as the Federal Aviation Administration (FAA), may establish maintenance requirements for helicopter 100 and its components. For example, the maintenance manual for aircraft 101 will establish certain overhaul intervals for the operating equipment, such as the engine 102, MRGB 103, mast 108 components, main rotor hub 111, blades 110, etc. At the designated intervals, the components may need to be disassembled and removed from helicopter 101 for maintenance to be performed off-aircraft at a local shop or remote depot. Gears, bearings, and other mechanical components of MRGB 103 are subject to wear and heat generation due to contact with other components and may need to be repaired or replaced over time.

It should be appreciated that the embodiments disclosed in the present application may be used on aircraft other than helicopters, such as airplanes, tilt rotors, unmanned aircraft, to name a few examples. Further, the embodiments of the present application may be used on non-aircraft vehicles and implementations. For example, in the illustrated example, MRGB 103 is depicted as a gearbox on helicopter 100; however, it should be appreciated the embodiments disclosed herein may be equally implemented on a variety of vehicles and structures.

FIG. 2 illustrates example components for a helicopter transmission assembly 200 according to one embodiment that is useable with a gearbox cover, port plugs, and mast cap as disclosed herein. Transmission assembly 200 includes a lower MRGB case 201, an upper MRGB case 202, a mast 203, and a hub section 204. These components are coupled to other helicopter equipment, such as a rotor system and engine drive shaft (not shown), when installed and operating in an aircraft. During certain maintenance intervals or when a component fails, one or more transmission assembly 200 components may be removed from the aircraft. In one embodiment, for example, lower MRGB case 201 and upper MRGB case 202 are separate components that are bolted together during operation, but may be separated for maintenance, inspections, or other procedures.

When removed from the aircraft, transmission assembly 200 is exposed to the environment in several places, such as the bottom and top of lower MRGB case 201, ports 205, the bottom of upper MRGB case 202, and/or mast opening 206. Ports may provide openings for a power input quill from the engine, a rotor brake quill, and/or a hydraulic system or accessory drive quill, for example. Prior maintenance practices would often include covering the openings with plastic sheeting and tape. However, these components may be more adequately protected using covers, plugs, or caps that are specifically adapted for each opening of each component.

The covers, plugs, and caps disclosed herein may be manufactured using additive manufacturing techniques, such as three-dimensional (3D) printing, or other fabrication methods such as injection molding. Generally, in additive manufacturing, structures are made by depositing thousands of very thin layers that are combined to create a product. The additive manufacturing process involves the use of a computer and specialized CAD software that can control a machine that "prints" in the desired shape. Additive manufacturing may be used with a range of different materials. A cartridge in the printing machine is loaded with the relevant substance and this is printed into the desired shape, one thin layer at a time. These layers are repeatedly printed on top of each other and are fused together during the process until the shape is complete. Additive manufacturing allows for a great range of shapes to be produced. Designs that cannot be manufactured in a single piece with traditional means can easily be achieved using additive manufacturing. For example, shapes with scooped-out or hollow areas may be printed as a single piece without the need to weld or attach individual components together. This makes the product stronger and eliminates weak spots that could be compromised or stressed. The color of the additive-manufacturing product may be selected by the type of material used for printing, which eliminates the need for painting the products. Additional coatings, such as clear epoxy, may be added to provide extra protection and to seal porous materials.

Once process for additive manufacturing is Fused Deposition Modeling (FDM) in which an object is built by selectively depositing melted material in a pre-determined path layer-by-layer. The materials used in FDM are thermoplastic polymers that originate in a filament form. In one embodiment, Acrylonitrile Styrene Acrylate (ASA) plastic is used in an FDM manufacturing process to create the covers, plugs, and caps disclosed herein. Alternatively, other additive manufacturing processes, such as Stereolithography (SLA), Selective Laser Sintering (SLS), Direct Metal Laser Sintering (DMLS), Selective Laser Melting (SLM), or Fused Filament Fabrication (FFF), and/or other materials, such as Acrylonitrile Butadiene Styrene (ABS), Polylactic Acid (PLA), Polyethylene Terephthalate Glycol (PETG), Nylon, Thermoplastic Polyurethane (TPU), or Polycarbonate (PC), may be used. Since the covers, plugs, and caps would likely be used outside, the selected material would preferably be UV resistant, weather resistant, and impact resistant. Furthermore, additive manufacturing processes may be used to rebuild the structure of the covers, plugs, and caps if they become worn out, without remaking the entire structure.

A user of the covers, plugs, and caps disclosed herein may choose to produce the items themselves when needed using additive manufacturing. Alternatively, a manufacturer may create the covers, plugs, and caps in bulk for distribution to multiple users. Because the additive manufacturing process does not require a specific mold or tool, it allows users to manufacture low volumes of the components on demand.

Referring to FIGS. 3, 4A/B, and 5A/B, various covers and plugs are shown that are adapted for the lower MRGB case 201. FIG. 3 illustrates lower MRGB case 201 separate from the rest of the transmission assembly and with cover 301 and plugs 302 attached. FIG. 4A is an oblique view of the top of cover 301. FIG. 4B is an oblique view of the bottom of cover 301.

Cover 301 and plugs 302 may be created by an additive manufacturing process. The bottom of cover 301 has a lip 303 that rest on the shoulder 304 of the lower MRGB case 201. Cover 301 has a flange 305 that fits within the top opening of the lower MRGB case 201. The shoulder 304 of lower MRGB case 201 has a plurality of holes 306 that can be aligned with corresponding holes in upper MRGB case 202 and are adapted to accept bolts that hold the two components together when installed in an aircraft. The lip 303 of cover 301 has one or more flanges 307 that are configured to overlap shoulder 304. Flanges 307 may extend entirely around cover 301 or may be in discrete positions as shown in FIGS. 3 and 4A,4B. Flanges 307 have one or more holes 308 that can be aligned with holes 306 in shoulder 304. An attaching mechanism, such as thumbscrew 309, may be used to securely affix cover 301 to lower MRGB case 201. When not in use, thumbscrew 309 may be stored by threading it into a staging stud 310. Thumbscrew 309 may be attached to cover 301 using a lanyard 311 to prevent loss when not in use and not properly stored.

The top surface 312 of cover 301 may have one or more handles 313 to make it easier for users to carry or adjust cover 301. The finger pockets 314 provide room for users' hands to grasp handles 313. Handles 313 and finger pockets 314 form protruding areas 316 on the bottom surface 315 of cover 301.

A cutout area 317 may be formed in the top surface 312 to provide a space to hold a desiccant container 318 that holds a silica gel or other hygroscopic substance used as a drying agent. The desiccant protects the lower MRGB case 201 against excess moisture, which can promote corrosion. Desiccant container 318 may be removably attached to cover 301, such as by a threaded or snap connection. The desiccant in container 318 may have an indicating color, such as blue silica gel that changes color to pink when it reaches a maximum absorption capacity. Guard or barrier 319 may be formed in the top surface 312 to protect desiccant container 318 from being knocked off cover 301 or otherwise damaged. Desiccant cutout area 317 forms protruding area 320 on the bottom surface 315. Hole 321 is coupled to desiccant container 318 and allows the desiccant to remove moisture from the lower MRGB case 201 when cover 301 is installed.

Bottom surface 315 may include structural elements, such as ribs 322, to provide rigidity and/or to strengthen cover 301. Bottom surface 315 may also include one or more engaging components 323 that are configured to interact with structures within lower MRGB case 201, such as a planetary gear or other gear or shaft, and to hold those structures in place when lower MRGB case 201 is moved.

Each of the ports 205 in lower MRGB case 201 may have a unique size and shape, or they may have uniform dimensions. Accordingly, plugs 302 may be configured to fit any port 205 or may be designed for a specific port 205. FIG. 5A is an oblique view of the top of an example plug 302. FIG. 5B is an oblique view of the bottom of plug 302. Plug 302 has a narrow neck portion 331 that is configured to fit within the opening of port 205. Wide neck portion 332 has a bigger diameter than port 205 and narrow portion 331 and forms lip 333. When installed, narrow portion 331 is placed into port 205 and lip 333 rests against the surface of lower MRGB case 201 around port 205. A groove 334 may be formed in narrow portion 331 to accept an O-ring 335 or other gasket, which creates an airtight and watertight seal. Although not shown in FIG. 4B, it will be understood that a similar groove and O-ring structure may be included on flange 305 in cover 301.

An extended rim 336 on wide portion 332 provides a handle surface that allows users to pull on plug 302 when removing from lower MRGB case 201. Open regions or voids 337 may be formed in wide portion 332 to reduce overall weight and material requirements and to provide finger grips for use when removing plug 302. In one embodiment, text 338 may be formed in a top surface of extended rim 336 to indicate a part number, port name, or other information. The inside region of narrow portion 331 may be formed with hollow regions 339 to reduce overall weight and material requirements. Extended areas 340 may also be formed within narrow portion 331. A fastener 341 may be installed in the extended area 340 to provide a connection for a tool or other device, such as a threaded nut-type fastener that is adapted to receive a bolt.

FIG. 6 illustrates two plugs 302a, 302b stacked together. In one embodiment, the diameter of inside region 601 of a plug 302 is selected to match the diameter of the narrow portion 602 of the plug. The diameters may be selected to allow the plugs 302a, 302b to be stacked together. This would allow for improved storage and organization of the plugs 302. Friction between the surface of plugs 302a, 302b and/or O-ring 603 may keep the stacked plugs together when stacked.

Referring to FIGS. 7 and 8A/B, various covers and plugs are shown that are adapted for the upper MRGB case 202. FIG. 7 shows upper MRGB case 202 separate from the rest of the transmission assembly and with cover 701 and mast plug 702 attached. FIG. 8A is an oblique view of the top of cover 701. FIG. 8B is an oblique view of the bottom of cover 701.

Cover 701 is adapted to fit the bottom opening of upper MRGB case 202 when it is removed from lower MRGB case 201. Cover 701 and mast plug 702 may be created by an additive manufacturing process. A flange 703 on the bottom edge of upper MRGB case 202 has several holes 704 that may be aligned with corresponding holes in lower MRGB case 201 and are adapted to accept bolts that hold the two components together when installed in an aircraft. The top side of cover 701 has an outside rim 705 with two or more threaded holes 706. When cover 701 is installed on upper MRGB case 202, holes 704 can be aligned to holes 706. An attaching mechanism, such as thumbscrew 707, may be used to securely affix cover 701 to upper MRGB case 202. When not in use, thumbscrew 707 may be stored by threading it into one of holes 706. Thumbscrew 707 may be attached to cover 701 using a lanyard 708 to prevent loss when not in use and not properly stored.

Cover 701 has a bottom surface 709 in which several indented finger pockets 710 that function as handles or grips to make it easier for users to carry or adjust cover 701. Finger pockets 710 appear as protrusions 711 on the top surface 712 of cover 701.

Referring to FIGS. 9 and 10A/B/C, a mast cap is shown that is adapted for use on the rotor system when the slip ring is removed. FIG. 9 shows the rotor system 900 and upper MRGB case 202 with mast cap 901 attached. FIG. 10A is an oblique view of the top of mast cap 901. FIG. 10B is an oblique view of the bottom of mast cap 901. FIG. 10 C is a bottom view of mast cap 901.

Rotor system 900 is attached to upper MRGB case 202 and includes rotor blades 902 attached to a hub 903 and mast 904. When a slip ring has been removed from rotor system 900, the interior of mast 904 is exposed to the environment, which may lead to corrosion and contamination. Mast cap 901 in installed on rotor system 900 to protect the aircraft components while the slip ring is removed. As a safety measure, "remove before flight" flags 905 are attached to mast cap 901 with lanyards 906 to ensure that maintenance and flight personnel know that the mast cap is in place.

Mast cap 901 is a cylindrical structure that may be created by an additive manufacturing process. Mast cap 901 has a hollow upper section defined by sidewall 907. Open regions or voids 908 in sidewall 907 reduce the amount of material required during manufacture and create a lattice or mesh configuration. A desiccant container 909 that holds a silica gel or other hygroscopic substance used as a drying agent is installed in the hollow section defined by sidewall 907. Desiccant container 909 may be removably attached to mast cap 901, such as by a threaded or snap connection. Hole 910 on the bottom surface 911 of mast cap 901 is coupled to desiccant container 909 through the bottom section of the mast cap and allows the desiccant to remove moisture from the upper MRGB case 202 and mast 904 when mast cap 901 is installed.

The bottom surface 911 of mast cap 901 has a flange 912 with a diameter that is adapted to fit within an opening on top of mast 904. A groove 913 may be formed in flange 912 to accept an O-ring 914 or other gasket, which creates an airtight and watertight seal in the mast.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A device, comprising:
    a structure having a top side and a bottom side;
    a first flange extending from the bottom side of the structure, the first flange configured to fit within an opening in a mechanical component for an aircraft when the mechanical component is disassembled from its operative position on the aircraft; and
    one or more second flanges positioned around a peripheral edge of the structure, the second flanges having one or more holes configured to align with holes in the mechanical component, wherein the holes are adapted to receive an attachment device to secure the structure to the mechanical component.

2. The device of claim 1, further comprising:
    a desiccant container coupled to the top of the structure, wherein a hole between the top side and the bottom side exposes a desiccant material to the mechanical component.

3. The device of claim 1, further comprising:
    a staging stud formed in the top side of the structure, the staging stud configured to receive the attachment device.

4. The device of claim 1, wherein the attachment device comprises a thumbscrew.

5. The device of claim 1, further comprising:
    one or more handles formed in the top side of the structure.

6. The device of claim 1, wherein the structure prevents contaminants from entering the mechanical component when attached to the mechanical component.

7. The device of claim 1, wherein the mechanical component is a main rotor gearbox.

8. The device of claim 1, wherein the structure is created by an additive manufacturing process.

* * * * *